United States Patent [19]

Takarada et al.

[11] Patent Number: 5,047,701
[45] Date of Patent: Sep. 10, 1991

[54] MANIPULATOR

[75] Inventors: Shinichi Takarada, Yokohama; Satoshi Mohri, Tokyo, both of Japan

[73] Assignee: Hitachi, Ltd., Tokyo, Japan

[21] Appl. No.: 536,801

[22] Filed: Jun. 12, 1990

[30] Foreign Application Priority Data

Jun. 12, 1989 [JP] Japan ................................. 1-146569

[51] Int. Cl.$^5$ ............................................ G05B 19/42
[52] U.S. Cl. ................... 318/568.1; 318/574; 318/568.16; 901/9; 364/513
[58] Field of Search ................. 318/560–646; 364/513, 424.1, 424.01, 424.06; 901/9, 13, 15–22, 40, 47

[56] References Cited

U.S. PATENT DOCUMENTS

| 4,777,585 | 10/1988 | Kokawa et al. | 364/513 X |
| 4,809,175 | 2/1989 | Hosaka et al. | 364/513 X |
| 4,842,342 | 6/1989 | Takahashi et al. | 364/424.01 X |
| 4,864,490 | 9/1989 | Nomoto et al. | 364/513 X |
| 4,882,526 | 11/1989 | Iino et al. | 318/561 |
| 4,967,129 | 10/1990 | Tanaka | 318/621 |

Primary Examiner—Paul Ip
Attorney, Agent, or Firm—Antonelli, Terry, Stout & Kraus

[57] ABSTRACT

A manipulator having a plurality of articulations to be controlled with a given destination value of position and orientation, has a finite difference unit for obtaining a finite difference between the destination value and a present value for each articulation, and a fuzzy inference determination unit for executing a fuzzy inference for each articulation by using the finite difference and determining a command value for each articulation. The position of the manipulator terminal may be obtained on the basis of each articulation angle data, video data from a TV camera, or data from an ultrasonic sensor.

16 Claims, 11 Drawing Sheets

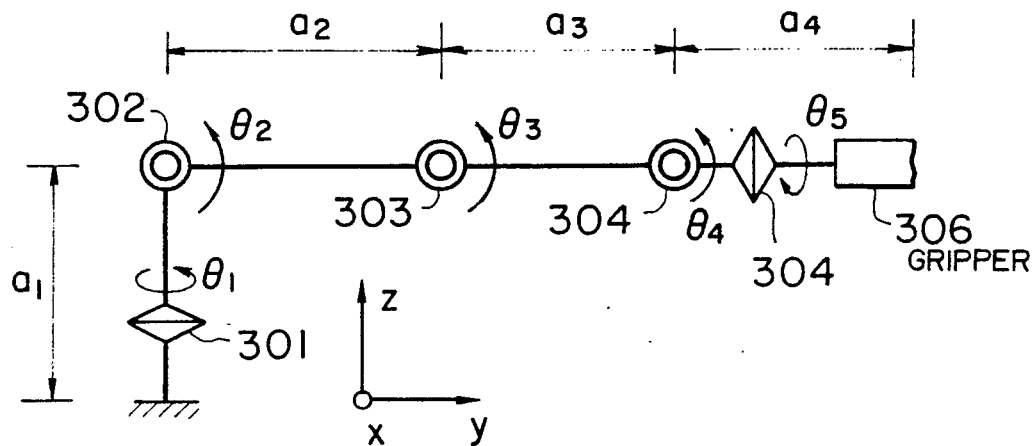
FIG. 3 MANIPULATOR 201
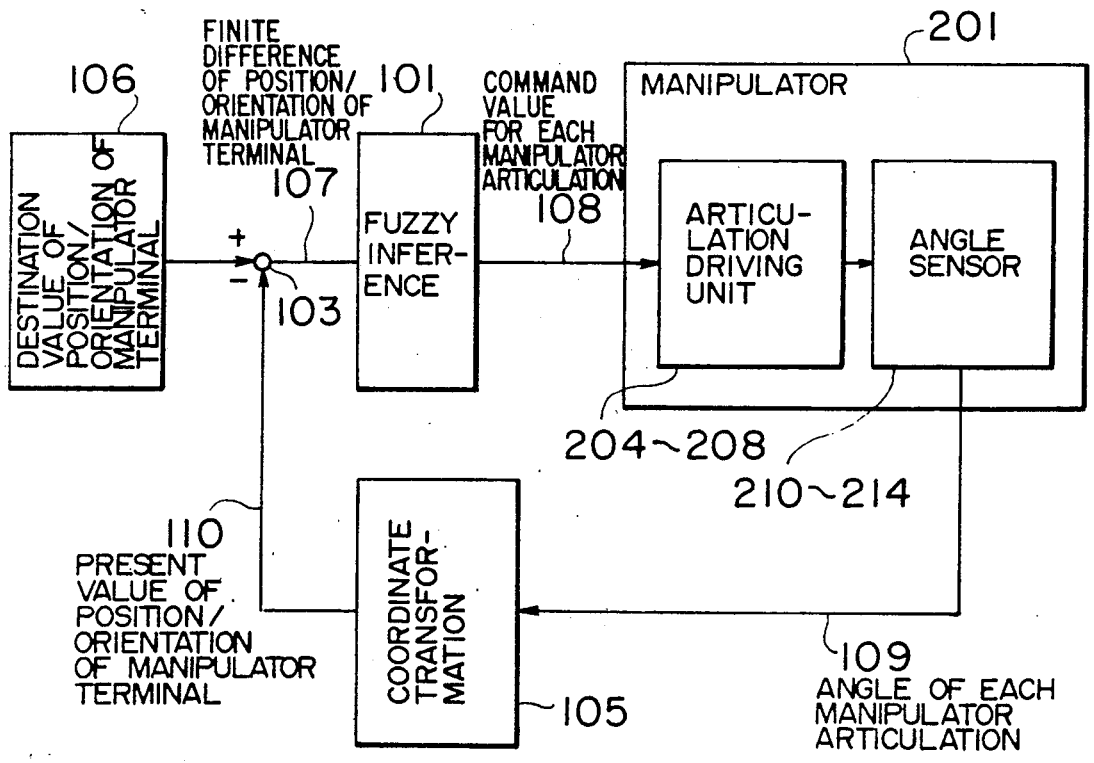
FIG. 4 MANIPULATOR CONTROL

FIG. 5A  MEMBERSHIP FUNCTIONS IN IF STATEMENT
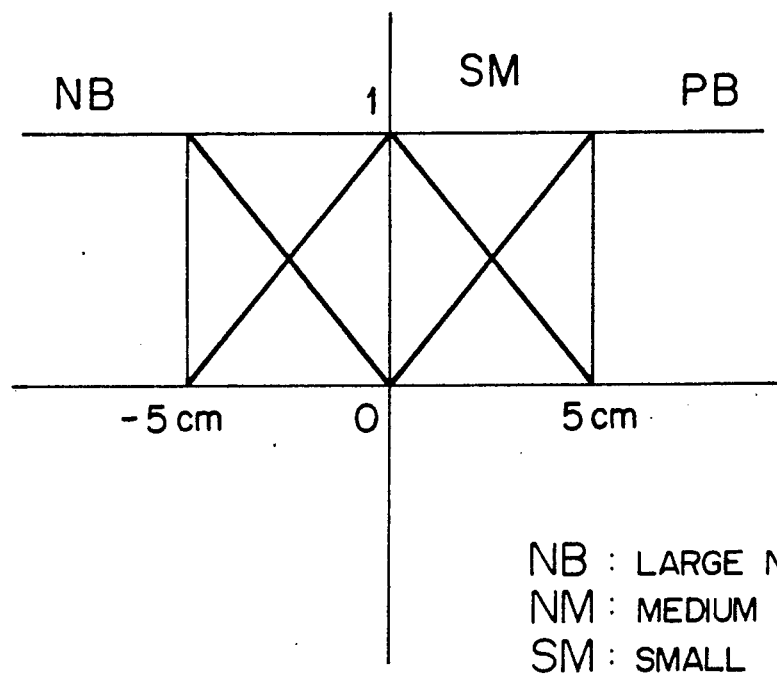
NB : LARGE NEGATIVE
NM : MEDIUM NEGATIVE
SM : SMALL
PM : MEDIUM POSITIVE
PB : LARGE POSITIVE
FIG. 5B  MEMBERSHIP FUNCTIONS IN THEN STATEMENT
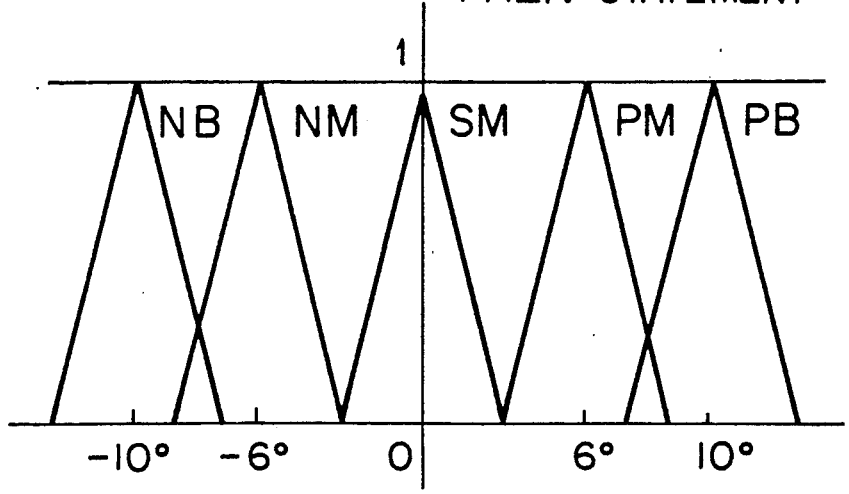

MANIPULATOR

BACKGROUND OF THE INVENTION

The present invention generally relates to a manipulator, and more particularly to a fuzzy control method and apparatus for a manipulator, and a manipulator system using the method and apparatus.

In a conventional manipulator control method, each articulation angle is obtained through geometric coordinate transformation on the basis of a given position-/orientation of the manipulator terminal or tip, as described in Chapter III of "Robot Manipulator" by R. P. Pole, translated Kunio Yoshikawa, published in September, 1984 by Corona Shuppan K. K. If the dynamic characteristics, e.g. vibrations of a manipulator are also to be controlled, a model is formulated and a complicated formula is solved, as described in Japanese Patent Laid-open Publication JP-A-62-235602.

The above conventional technique requires a voluminous calculation for the determination of command values to articulations of a manipulator, resulting in a problem of a long sampling time starting from measuring a position with a sensor to fetching the calculation results. Another significant subject is to process a so-called singular point which has a value 0 at the denominator of a formula. Further since a manipulator system is expressed by formulas, these formulas are required to change with environmental conditions and control conditions.

SUMMARY OF THE INVENTION

It is an object of the present invention to provide a fuzzy control method and apparatus for a manipulator, and a manipulator system using the method and apparatus, capable of controlling a manipulator with a small amount of calculations and flexibly dealing with a change in environmental conditions and control conditions.

It is another object of the present invention to provide a manipulator control method/system capable of reliably executing a sophisticated fuzzy control for a manipulator with a small amount of calculations and without a necessity of higher performance of a computer.

It is a further object of the present invention to provide a manipulator control method/system capable of dealing with a change in environmental conditions and control conditions, simply by using additional fuzzy rules.

It is a still further object of the present invention to provide a manipulator control method/system capable of determining the position of the terminal of a manipulator with redundant degree of freedom even if one of articulations enters in malfunction.

In order to achieve the above objects of the present invention, there is provided a fuzzy control method and apparatus for a manipulator, and a manipulator system using the method and apparatus, wherein a manipulator fuzzy control is executed by determining command values for articulation angles in such a manner that fuzzy inference is replaced with a part of, or whole of, matrix operations in order to make small the amount of calculations, and the fuzzy inference is executed by using not the absolute value of a target value (destination coordinate value) but a finite difference between the target and actual values of the position/orientation of the manipulator terminal to flexibly deal with a change in environmental conditions.

According to the fuzzy control method and apparatus for a manipulator, and the manipulator system using the method and apparatus, fuzzy inference is executed by using only comparison operation and proportion operation, i.e., four fundamental arithmetic operations. Therefore, the amount of calculations can be reduced considerably as compared with the matrix operation for coordinate transformation including trigonometric function operation. Fuzzy inference is conducted by using a finite difference, i.e., a relative value, between the target and actual values of the manipulator terminal. It is therefore always possible to ultimately reach the target value even if there is an error from an ideal state, such as a deformation of an arm. In obtaining the results of fuzzy inference, the denominator for a division operation is the sum of membership functions. Therefore, there is no singular point which leads to no solution.

BRIEF DESCRIPTION OF THE DRAWINGS

FIG. 3 is a diagram showing the structure of the manipulator;

FIG. 4 is a control block diagram of the manipulator system of this invention;

FIGS. 5A and 5B are diagrams illustrating the membership functions of fuzzy inference;

DETAILED DESCRIPTION OF THE INVENTION

Figure 1:
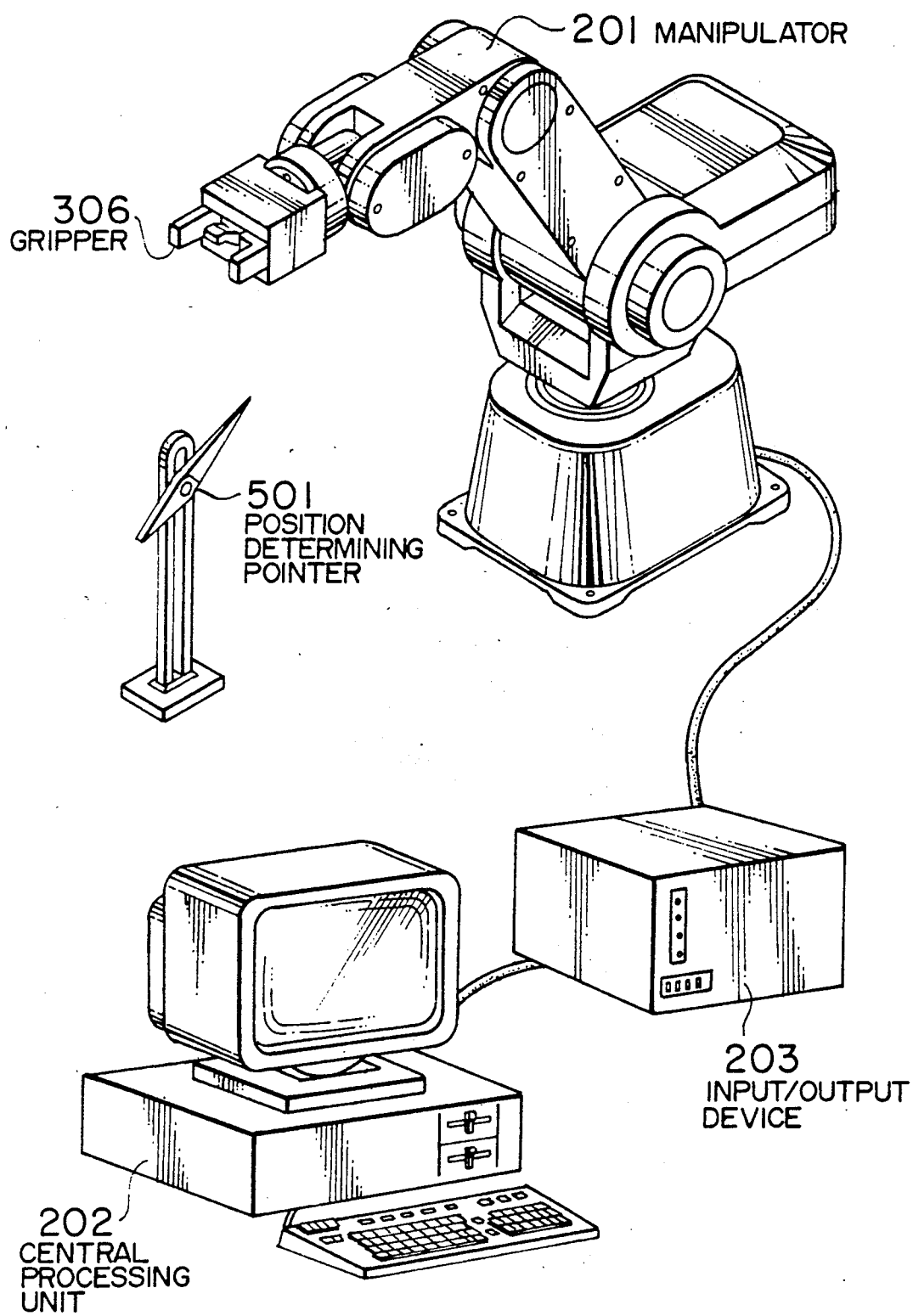
FIG. 1 is a perspective view showing the structure of a manipulator system of this invention.

FIG. 1 is a perspective view of the manipulator system according to the first embodiment of this invention, the manipulator system being realized by the fuzzy control method and apparatus for a manipulator of this invention. Referring to FIG. 1, the manipulator system is constructed of three fundamental sections including a manipulator 201, central processing unit 202 and input-/output (I/O) device 203. The manipulator 201 is constructed of five articulations and a gripper 306 at the terminal or distal end thereof. Reference numeral 501 represents a positioning pointer for the manipulator 201.

Figure 2:
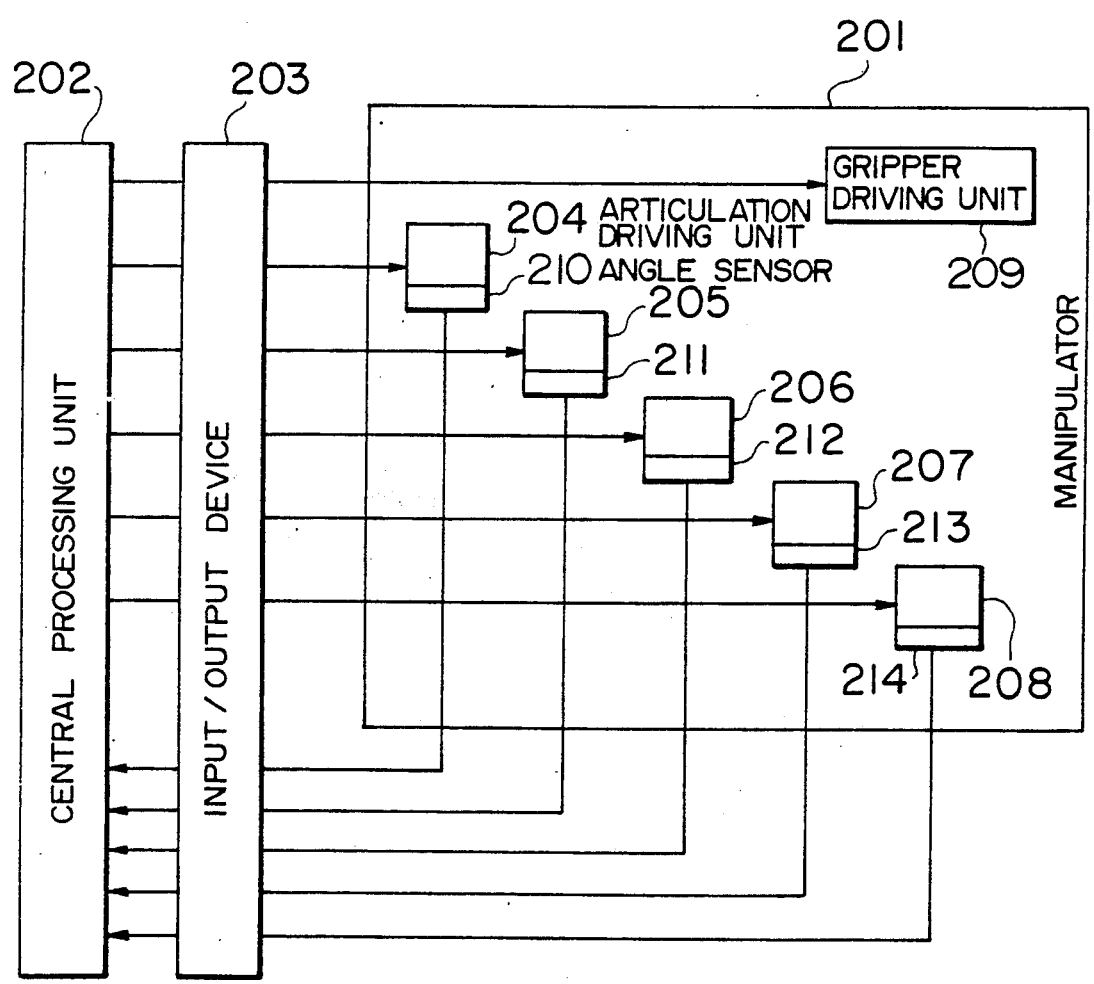
FIG. 2 is a functional block diagram of the manipulator system.

FIG. 2 is a functional block diagram of the manipulator system shown in FIG. 5. Each of the five articulations of the manipulator 201 houses therein corresponding one of articulation driving units 204 to 208 and corresponding one of angle sensors 210 to 214. The gripper 306 houses therein a gripper driving unit 209. The central processing unit 202 executes all necessary arithmetic operations for the manipulator system, and outputs a command value for each articulation and gripper 306 of the manipulator 201. Command values are supplied via the I/O device 203 to the articulation driving units 204 to 208 and gripper driving unit 209 to move the articulations and gripper 306. The angle of each articulation is detected with a corresponding one of the angle sensors 210 to 214, and sent to the central processing unit 202 via the I/O device 203.

FIG. 3 is a diagram showing the structure of the manipulator 201 shown in FIG. 1 (FIG. 2). Referring to FIG. 3, the five articulations of the manipulator 201 are named, from the base or proximal end of the manipulator, a first articulation 301, second articulation 302, third articulation 303, fourth articulation 304, and fifth articulation 305. At the terminal or distal end of the manipulator 201, there is mounted the gripper 306 for holding an object work. The arm length from the proximal end of the manipulator 201 to the second articulation 301 is represented by a1, that from the second articulation 302 to third articulation 303 by a2, that from the third articulation 303 to fourth articulation 304 by a3, and that from the fourth articulation 304 to the fifth articulation 305 by a4. As the reference coordinate system of the manipulator 201, the base of the manipulator 201 is used as the origin, the direction extending vertically from the back to the front of the drawing, as the x-axis, the direction extending to the right, as the y-axis, and the direction extending upward, as the x-axis. The angles of the first to fifth articulations 301 to 305 are represented by $\theta_1$ to $\theta_5$.

FIG. 4 is the control block diagram of the control system for the manipulator system shown in FIG. 1 (FIGS. 2 and 3). Referring to FIG. 4, a target value 106 of the position/orientation of the terminal of the manipulator 201 is subtracted by an actual value 110 of the position/orientation of the manipulator terminal, to thereby obtain a finite difference 107 of the position/orientation of the manipulator terminal. In accordance with the finite difference 107, command values 108 for the articulations 301 to 305 of the manipulator 201 are obtained by means of fuzzy inference, and inputted to the articulation driving units 204 to 208 to drive the manipulator 201 accordingly. Respective articulation angles 109 detected with the angle sensors 210 to 214 of the manipulator 201 are subjected to coordinate transformation so that the actual value 110 of the position/orientation of the manipulator terminal can be obtained.

The coordinate transformation 105 shown in FIG. 5 will be described below.

The terminal position of the manipulator 201 is determined by means of rotational coordinate transformation for the articulations 301 to 305 and be means of parallel displacement according to the lengths between the articulations. Accordingly the x-, y-, and z-axis coordinates X, Y, and Z of the terminal position of the manipulator 201 are given by the following equations (1):

$$\begin{aligned} X &= -\sin\theta_1 \{a_4\cos(\theta_2 + \theta_3 + \theta_4) + a_3\cos(\theta_2 + \theta_3) + a_2\cos\theta_2\} \\ Y &= \cos\theta_1 \{a_4\cos(\theta_2 + \theta_3 + \theta_4) + a_3\cos(\theta_2 + \theta_3) + a_2\cos\theta_2\} \\ Z &= a_4\sin(\theta_2 + \theta_3 + \theta_4) + a_3\sin(\theta_2 + \theta_3) + a_2\sin\theta_2 + a_1 \end{aligned} \quad (1)$$

The orientation of the manipulator terminal is represented by the following equations (2):

$$\begin{aligned} \alpha &= \theta_2 + \theta_3 + \theta_4 \\ \beta &= \theta_5 \end{aligned} \quad (2)$$

where $\alpha$ represents an inclination angle of the axis of the gripper 306 relative to the x-y plane, and $\beta$ represents a rotational angle around the axis of the gripper 306.

The method of fuzzy inference 101 shown in FIG. 4 will be described next. Various types of fuzzy rules are available because of high redundancy of fuzzy inference 101. One example will be given in the following. It is assumed that the terminal of the manipulator 201 operates at the position forwardly of the first articulation 301, i.e., at the position forwardly of the first articulation 301, i.e., at the position having the positive coordinate value Y in FIG. 3. If the finite difference of the first articulation 301 is a large positive value in the x-axis direction, the first articulation 301 is rotated by a large positive amount to trace the object value. On the other hand, if the finite difference is small, it is not necessary to cause the first articulation 301 to move. If the finite difference has a large negative value, the first articulation 301 is rotated by a large negative amount. Fuzzy rules are accordingly given by the following:

$$\begin{aligned} &\text{IF } \Delta X \text{ is } PB \text{ then } \Delta\theta_1 \text{ is } PB \\ &\text{IF } \Delta X \text{ is } SM \text{ then } \Delta\theta_1 \text{ is } SM \\ &\text{IF } \Delta X \text{ is } NB \text{ then } \Delta\theta_1 \text{ is } NB \end{aligned} \quad (3)$$

where $\Delta X$ represents a finite difference in the x-axis direction, and $\Delta\theta_1$ represents a command value for the first articulation. PB indicates a large positive amount, SM a small amount, and NB a large negative amount. The corresponding membership functions are shown in FIGS. 5A and 5B.

FIGS. 5A and 5B show the membership functions of fuzzy inference 101 shown in FIG. 4, wherein FIG. 5A shows the membership function for "IF" statement and FIG. 5B shows the membership functions for "THEN" statement. In FIG. 5A, the membership function of PB in "IF" statement takes a value 0 for a negative finite difference $\Delta X$, increases the value as $\Delta X$ increases from 0 to 5 cm, and takes a value 1 for $\Delta X \geq 5$ cm. The membership function of SM takes a value 1 for $\Delta X = 0$, and gradually goes to 0 as $\Delta X$ goes to $+/-5$ cm. The membership function of NB is a function symmetrical of the membership function of PB relative to the vertical axis. In FIG. 5B, the membership functions of PB, PM, SM, NM, and NB in "THEN" statement take values as shown. PM represents a positive medium amount, and NM represents a negative medium amount.

Representing the membership functions of PB, SM, and NB in "IF" statement shown in FIG. 5A by $m_{PB}(\Delta X)$, $m_{SM}(\Delta X)$, and $m_{NB}(\Delta X)$, respectively, and representing the medians of PB, NB, PM, NM, and SM in "THEN" statement shown in FIG. 5B as $T_{PB}$, $T_{NB}$, $T_{PM}$, $T_{NM}$, respectively, then the command value $\Delta\theta_1$ to the first articulation 301 is given by:

$$\Delta\theta_1 = \frac{T_{PB} \times m_{PB}(\Delta X) + T_{SM} \times m_{SM}(\Delta X) + T_{NB} \times m_{NB}(\Delta X)}{m_{PB}(\Delta X) + m_{SM}(\Delta X) + m_{NB}(\Delta X)} \quad (4)$$

Since $m_{PB}(\Delta X)$ and $m_{NB}(\Delta X)$ are symmetrical with each other, a new membership function $m(\Delta X)$ is defined as follows:

$$m(\Delta X) = m_{PB}(\Delta X) \quad (\Delta X \geq 0) \quad (5)$$
$$= -m_{NB}(\Delta X) \quad (\Delta X < 0)$$

Using this membership function $m(\Delta X)$, the command value is given by:

$$\Delta\theta_1 = \frac{T_{PB} \times m(\Delta X) + T_{SM} \times m_{SM}(\Delta X)}{m(\Delta X) + m_{SM}(\Delta X)} \quad (6)$$

If this membership function $m(\Delta X)$ is used, fuzzy rules can be described by using only those rules having a positive value at the right-hand side. In all embodiments given hereinafter, only positive rules are described.

Fuzzy rules for the second articulation 302 may be expressed by:

$$\left.\begin{array}{l}\text{IF } \Delta Y \text{ is } PB \text{ then } \Delta\theta_2 \text{ is } NM \\ \text{IF } \Delta Y \text{ is } SM \text{ then } \Delta\theta_2 \text{ is } SM \\ \text{IF } \Delta Z \text{ is } PB \text{ then } \Delta\theta_2 \text{ is } PB \\ \text{IF } \Delta Z \text{ is } SM \text{ then } \Delta\theta_2 \text{ is } SM\end{array}\right\} \quad (7)$$

The command value $\Delta\theta_2$ to the second articulation 302 is therefore given by:

$$\Delta\theta_2 = \frac{T_{NM} \times m(\Delta Y) + T_{SM} \times m_{SM}(\Delta y) + T_{PB} \times m(\Delta Z) + T_{SM} \times m_{SM}(\Delta Z)}{m(\Delta Y) + M_{SM}(\Delta Y) + m(\Delta Z) + m_{SM}(\Delta Z)} \quad (8)$$

The reason for weighting the finite difference $\Delta Z$ greater than $\Delta Y$ is that the articulation angle $\theta_2$ of the manipulator 201 has, in many cases, larger influence upon the y-axis components than the z-axis components. The degree of influence depends on the angle $\theta_2$. Therefore, if the magnitude of is introduced in "IF" statement of a fuzzy rule, the operation of a computer can be made to converge faster.

Similarly, fuzzy rules for the command values $\Delta\theta_3$ to $\Delta\theta_5$ to the third to fifth articulations 303 to may be expressed by:

$$\left.\begin{array}{l}\text{IF } \Delta Y \text{ is } PB \text{ then } \Delta\theta_3 \text{ is } PB \\ \text{IF } \Delta Y \text{ is } SM \text{ then } \Delta\theta_3 \text{ is } SM \\ \text{IF } \Delta Z \text{ is } PB \text{ then } \Delta\theta_3 \text{ is } PM \\ \text{IF } \Delta Z \text{ is } SM \text{ then } \Delta\theta_3 \text{ is } SM \\ \text{IF } \Delta\alpha \text{ is } PB \text{ then } \Delta\theta_4 \text{ is } PB \\ \text{IF } \Delta\alpha \text{ is } SM \text{ then } \Delta\theta_4 \text{ is } SM \\ \text{IF } \Delta\beta \text{ is } PB \text{ then } \Delta\theta_5 \text{ is } PB \\ \text{IF } \Delta\beta \text{ is } SM \text{ then } \Delta\theta_5 \text{ is } SM\end{array}\right\} \quad (9)$$

to obtain the command values 108 to the articulations 301 to 305 and control the manipulator 201.

In the above representations, the positions X, Y and Z of the articulations $\theta_1$, $\theta_2$, and $\theta_3$ near the base of the manipulator are weighted greater than those of the articulations $\theta_4$ and $\theta_5$ near the manipulator terminal. In other words, articulations near the terminal rather than articulations near the base are made to have a more important role in the orientation control of the manipulator, whereas for the position control of the manipulator, articulations near the base and not near the terminal are made to have a more important role. Obviously, as a modification, articulation $\theta_1$ and $\theta_2$ may be considered near the base and articulations $\theta_3$, $\theta_4$, and $\theta_5$ may be considered near the manipulator terminal for the weighting control of orientation and position.

Figure 6:
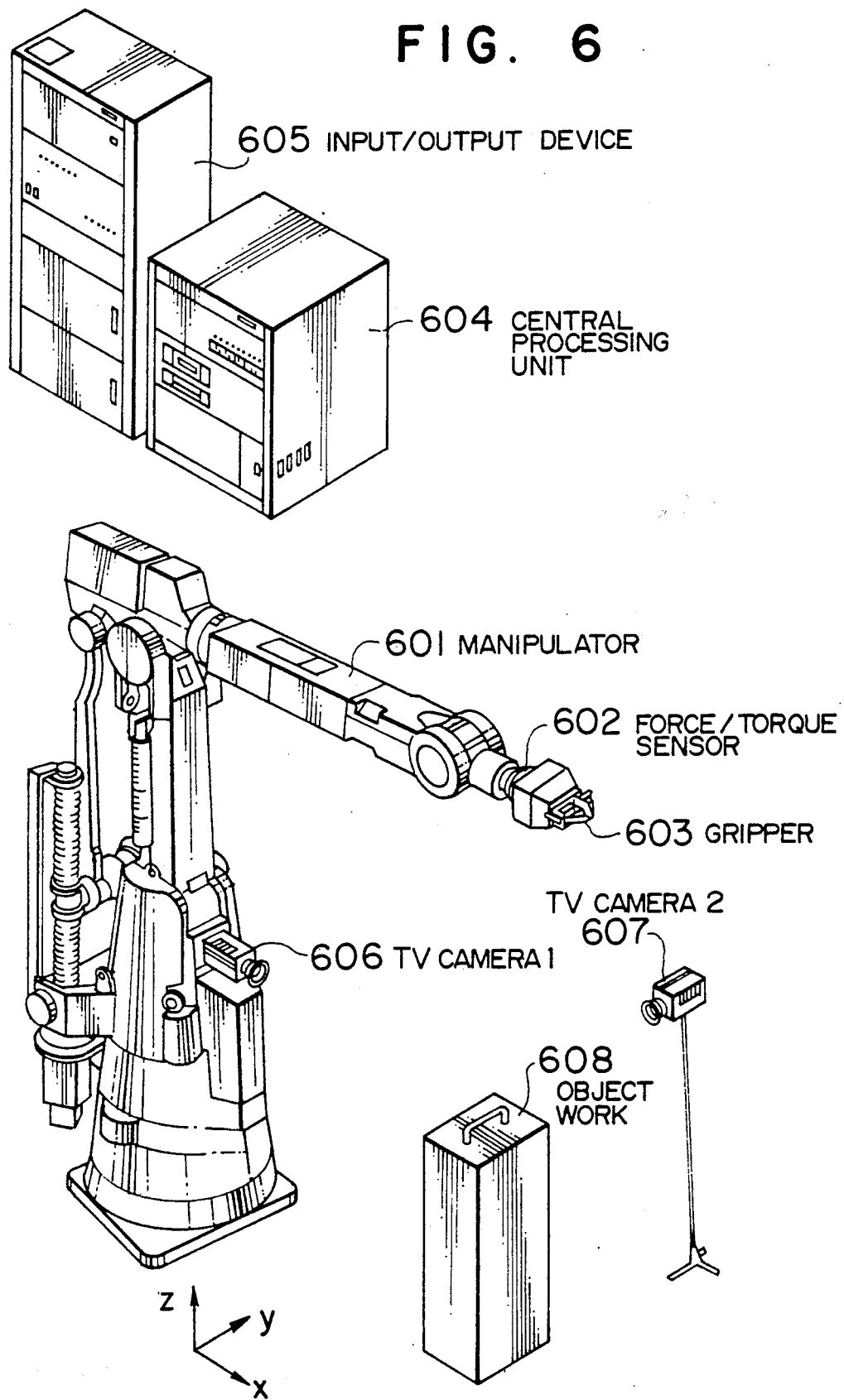
FIG. 6 is a perspective view showing a manipulator system according to the second embodiment of this invention.

FIG. 6 is a perspective view of the manipulator system according to the second embodiment of this invention, the manipulator system being realized by the fuzzy control method and apparatus for a manipulator of this invention. Referring to FIG. 6, a manipulator 601 has six articulations with a gripper 603 being mounted at the manipulator terminal. Mounted between the gripper 603 and the manipulator 601 is a force/torque sensor 602 which detects a force/torque. A central processing unit 604 executes all arithmetic operations of this system. An input/output (I/O) device 605 interfaces between the central processing unit 604 and the manipulator 601. Reference numeral 608 represents an object work. A TV camera (1) 606 detects the y-direction distance between the gripper 603 and the object work 608 and detects a roll angle deviation. Another TV camera (2) 607 detects the x- and z-direction distances between the gripper 603 and the object work 608 and detects a pitch angle and a yaw angle.

Figure 7:
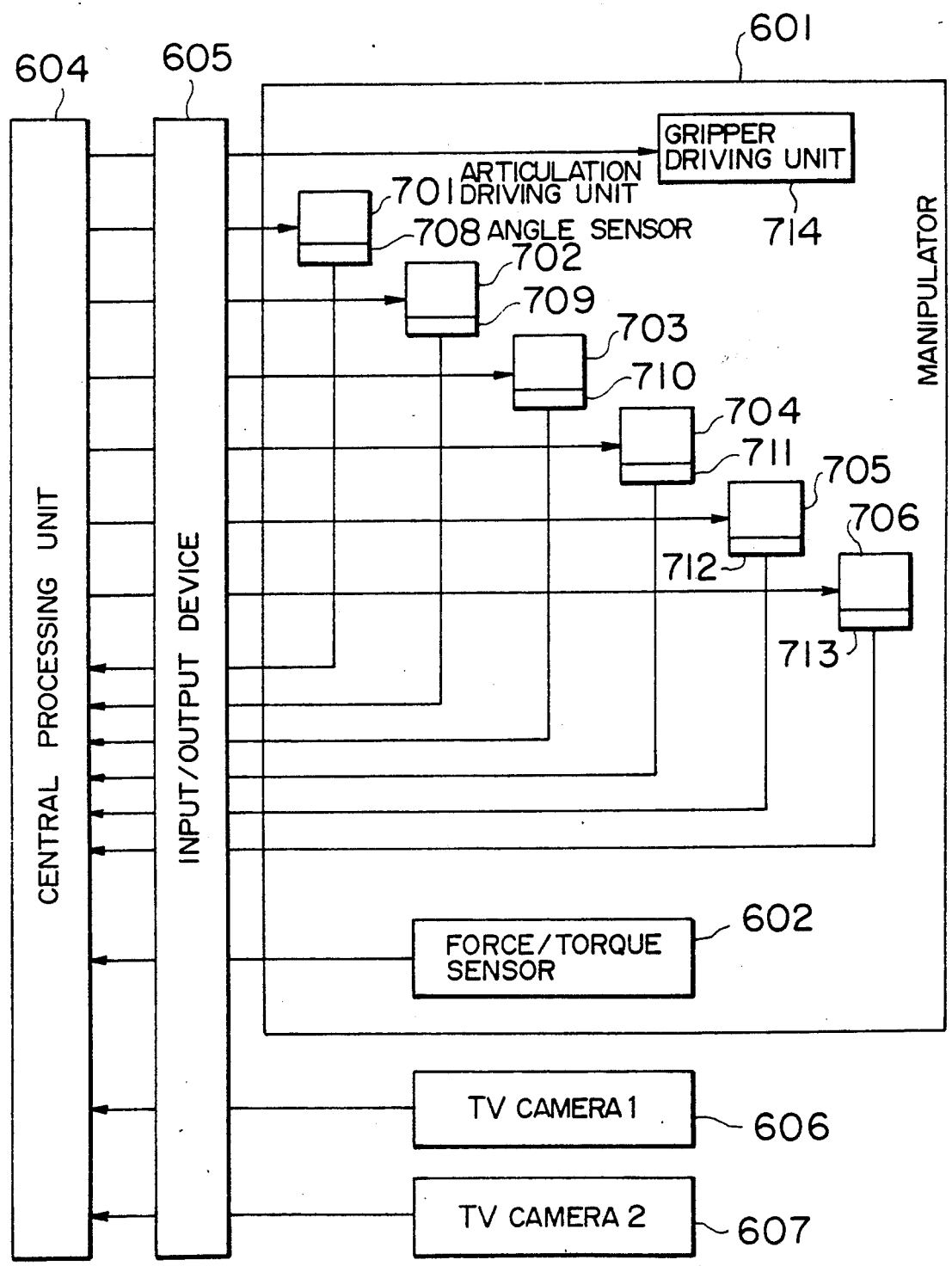
FIG. 7 is a functional block diagram of the manipulator system.

FIG. 7 is a functional block diagram of the manipulator system shown in FIG. 6. Referring to FIG. 7, each of the six articulations of the manipulator 601 houses therein corresponding one of articulation driving units 701 to 706 and corresponding one of angle sensors 708 to 713. The gripper 603 houses therein a gripper driving unit 714. The central processing unit 604 executes all necessary arithmetic operations for the manipulator system, and outputs a command value for each articulation and gripper 803 of the manipulator 601. Command values are supplied via the I/O device 605 to the articulation driving units 701 to 706 and gripper driving unit 714 to move the articulations and gripper 603. The angle of each articulation is detected with a corresponding one of the angle sensors 708 to 713, and sent to the central processing unit 604 via the I/O device 605. Signals from the force/torque sensor 602, TV camera (1) 606 and TV camera (2) 607 are also supplied to the central processing unit 604 via the I/O device 605.

Figure 8:
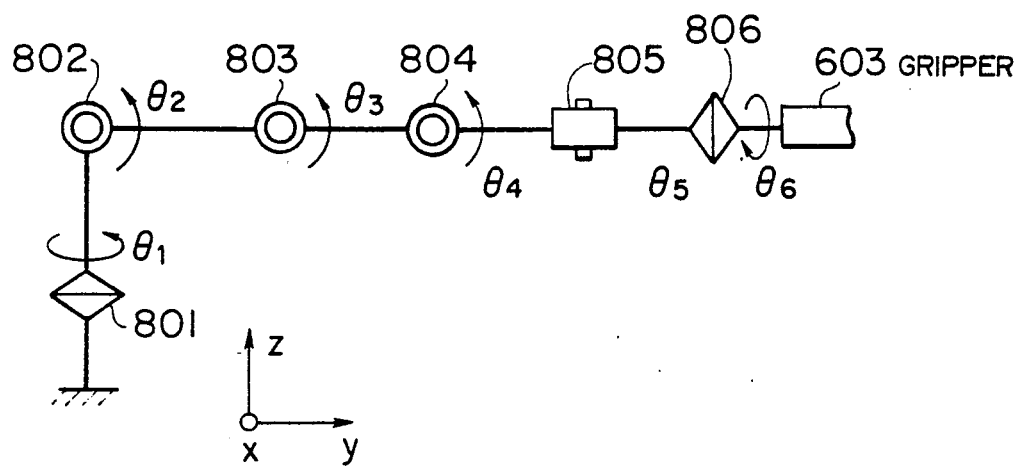
FIG. 8 is a diagram showing the structure of the manipulator.

FIG. 8 is a diagram showing the structure of the manipulator 601 shown in FIG. 6 (FIG. 7). Referring to FIG. 8, the six articulations of the manipulator 601 are named, from the base of the manipulator, a first articulation 801, second articulation 802, third articulation 803, fourth articulation 804, fifth articulation 805, and sixth articulation 806. At the terminal of the manipulator 601, there is mounted the gripper 603. The x-, y-, and z- axes of the reference coordinate system of the manipulator 601 are defined as shown in FIG. 8, and the origin is at the base of the manipulator 601. The angles of the first to sixth articulations are represented by $\theta_1$ to $\theta_6$.

Next, the control system shown in FIG. 7 (FIG. 8) will be described. The manipulator 601 is first moved to reach near the target value by the similar control method as described with the first embodiment shown in FIG. 1. Fuzzy rules for fuzzy inference of the manipulator 601 having six articulations 801 and 806 are given by:

(10)
```
IF ΔX is PB then Δθ₁ is PB
IF ΔX is SM then Δθ₁ is SM
IF θ₂ is SM and ΔY is PB then Δθ₂ is NM
IF θ₂ is SM and ΔY is SM then Δθ₂ is SM
IF θ₂ is SM and ΔZ is PB then Δθ₂ is PB
IF θ₂ is SM and ΔZ is SM then Δθ₂ is SM
IF θ₂ is PB and ΔY is PB then Δθ₂ is NB
IF θ₂ is PB and ΔY is SM then Δθ₂ is SM
IF θ₂ is PB and ΔZ is PB then Δθ₂ is PM
IF θ₂ is PB and ΔZ is SM then Δθ₂ is SM
IF ΔY is PB then Δθ₃ is PB
IF ΔY is SM then Δθ₃ is SM IF ΔZ is PB then Δθ₃ is PM
IF ΔZ is SM then Δθ₃ is SM
IF Δα is PB then Δθ₄ is PB
IF Δα is SM then Δθ₄ is SM
IF Δγ is PB then Δθ₅ is PB
IF Δγ is SM then Δθ₅ is SM
IF Δβ is PB then Δθ₆ is PB
IF Δβ is SM then Δθ₆ is SM
```

The definition of X, Y, Z, α, β, and $\theta_1$ to $\theta_5$ is similar to that of the first embodiment shown in FIG. 1 to 5. γ is one of parameters representative of the orientation of the terminal of the manipulator 601, and it represents the angle, relative to the y-axis, of the terminal image projected upon the x-y plane. $\theta_6$ is the angle of the sixth articulation 806 of the manipulator 601. Fuzzy rules are described by using only positive rules.

Figure 9:
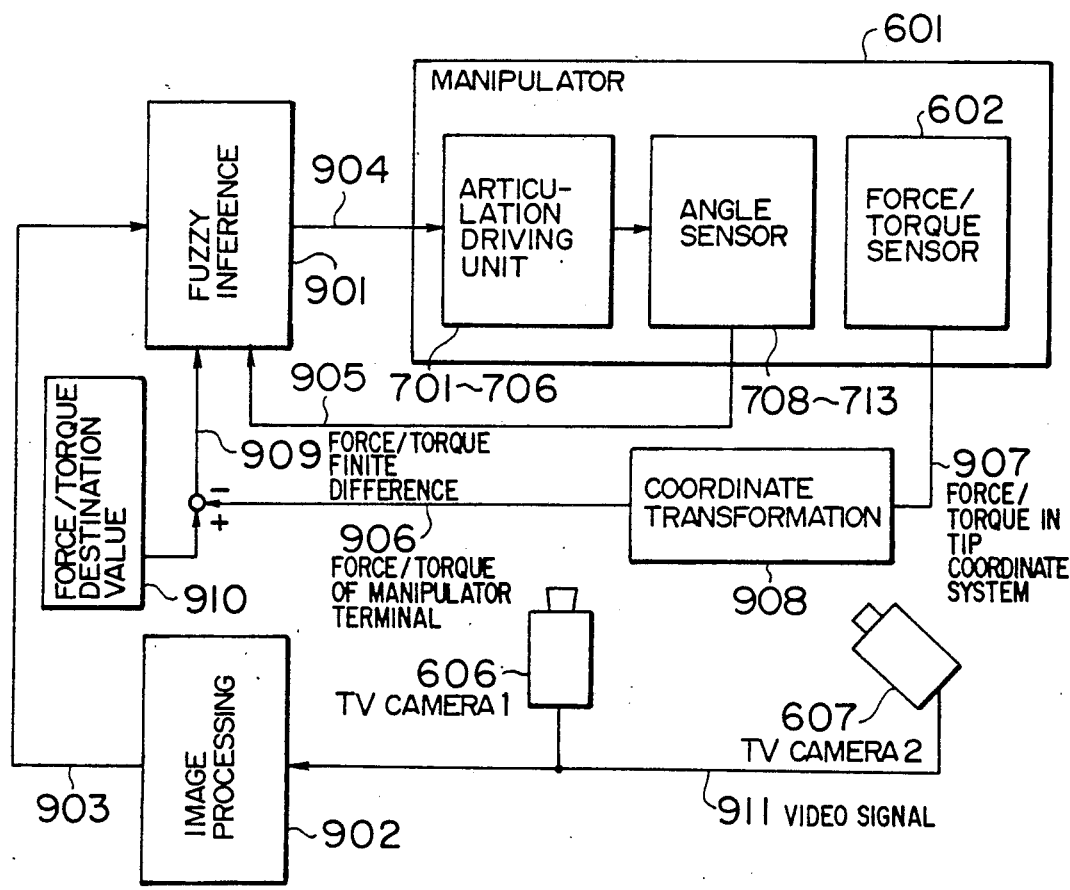
FIG. 9 is a control block diagram of the manipulator system.

After the manipulator terminal comes near the target value to a certain degree, signals from TV camera (1) 606 and TV camera (2) 607 are used for ΔX, ΔY, ΔZ, Δα, Δβ, and Δγ. The control system of the manipulator system of FIG. 6 (FIGS. 7 and 8) is shown in the control block diagram of FIG. 9. In FIG. 9, reference numeral 901 represents fuzzy inference, 902 an image processor, 903 a finite difference of the position/orientation at the manipulator terminal, 904 a command value to each manipulator articulation, 905 an angle of each manipulator articulation, 906 a force/torque at the manipulator terminal, 907 a force/torque in the tip co-ordinate system, 908 coordinate transformation, 909 a finite difference of a force/torque, 910 a target value of a force/torque, and 911 a video signal. The main different of the embodiment shown in FIG. 9 from that of FIG. 1 is that the finite difference 903 of the position-/orientation at the terminal of the manipulator 601 is obtained by image-processing 902 the video signals 911 from the TV cameras 606 and 607.

For the control of determination of only the position of the manipulator 601 shown in FIG. 9, the above-described fuzzy rules can be used for executing fuzzy inference 901. However, in this embodiment, since a compliance motion incorporating the force/torque control is carried out, there is added to fuzzy inference 901 an inference on the basis of the finite difference 909 of the force/torque. This force torque finite difference is obtained in the following manner. A force/torque signal 907 in the tip coordinate system outputted from the force/torque sensor 602 is subjected to coordinate transformation 908. As a result, there is obtained a force/torque 906 at the terminal of the manipulator having the forces Fx, Fy, and Fz in the x-, y-, and z-axes and torques $\tau_\alpha$, $\tau_\beta$, and $\tau_\gamma$ corresponding the angles α, β, and γ. This force/torque 906 is subtracted from a force/torque target value 910 to obtain the force/torque finite difference 909.

Next, fuzzy rules to be added fuzzy inference 901 in order to execute the compliance motion are shown. For the purpose of convenience, ΔX is SM and ΔY is SM and ΔZ is SM and
Δα is SM and ΔB is SM and Δγ is SM,
are expressed by
ΔTCP is SM,
then fuzzy rules are given by:

(11)
```
IF ΔTCP is SM and ΔFx is PB then Δθ₁ is PB
IF ΔTCP is SM and ΔFx is SM then Δθ₁ is SM
IF ΔTCP is SM and ΔFy is PB then Δθ₂ is NM
IF ΔTCP is SM and ΔFy is SM then Δθ₂ is SM
IF ΔTCP is SM and ΔFz is PB then Δθ₂ is PB
IF ΔTCP is SM and ΔFz is SM then Δθ₂ is SM
IF ΔTCP is SM and ΔFy is PB then Δθ₃ is PB
IF ΔTCP is SM and ΔFy is SM then Δθ₃ is SM
IF ΔTCP is SM and ΔFz is PB then Δθ₃ is PM
IF ΔTCP is SM and ΔFz is SM then Δθ₃ is SM IF ΔTCP is SM and Δτα is PB then Δθ₄ is PB
IF ΔTCP is SM and Δτα is SM then Δθ₄ is SM
IF ΔTCP is SM and Δτγ is PB then Δθ₅ is PB
IF ΔTCP is SM and Δτγ is SM then Δθ₅ is SM
IF ΔTCP is SM and Δτβ is PB then Δθ₆ is PB
IF ΔTCP is SM and Δτβ is SM then Δθ₆ is SM
```

As in the above manner, introducing fuzzy inference for the control of a manipulator allows to realize a desired control, even if an additional control parameter is added, without changing the original rules. Therefore, controls such as a control to take the dynamic characteristics into consideration, a control to aim at reducing a power consumption, a control to suppress vibration of an arm, or the like, may be readily realized by simply adding new rules.

Figure 10:
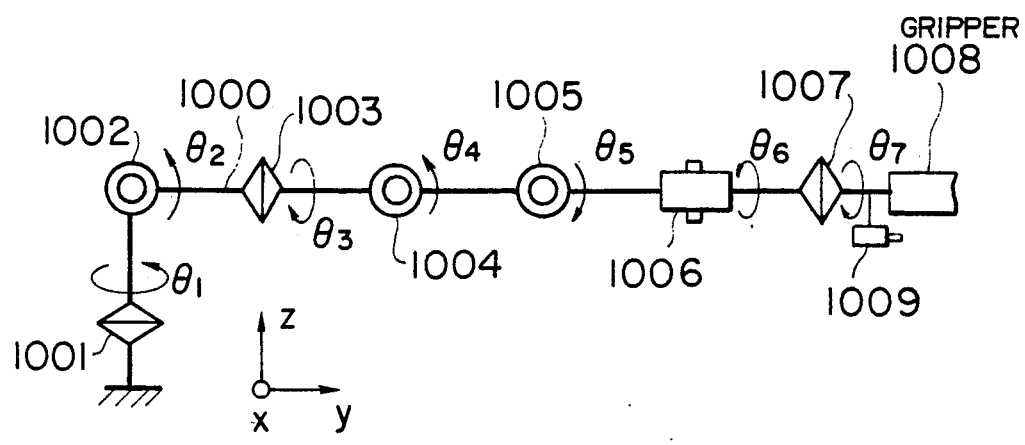
FIG. 10 is a diagram showing the structure of a manipulator according to the third embodiment of this invention.

FIG. 10 is a diagram showing the structure of the manipulator system with seven articulations and redundant degree of freedom according to the third embodiment of this invention, the manipulator system being realized by the fuzzy control method and apparatus for a manipulator of this invention. Referring to FIG. 10, reference numeral 1000 represents a manipulator, 1001 to 1007 first to seventh articulations, 1008 a gripper, and 1009 an ultrasonic sensor. $\theta_1$ to $\theta_7$ represent the angles of the articulations 1001 to 1007. This embodiment features first in that the manipulator articulations with redundant degree of freedom allow a smooth motion of the manipulator tip or terminal, and second in that seven articulations 1001 to 1007 are disposed such that even if one of the seven articulations 1001 to 1007 of the manipulator 1000 has a trouble, the remaining six articulations can cover the operation area as broad as possible. The ultrasonic sensor 1009 is mounted at the manipulator terminal to measure the distance and direction to an object work to be held by the gripper 1008.

Figure 11:
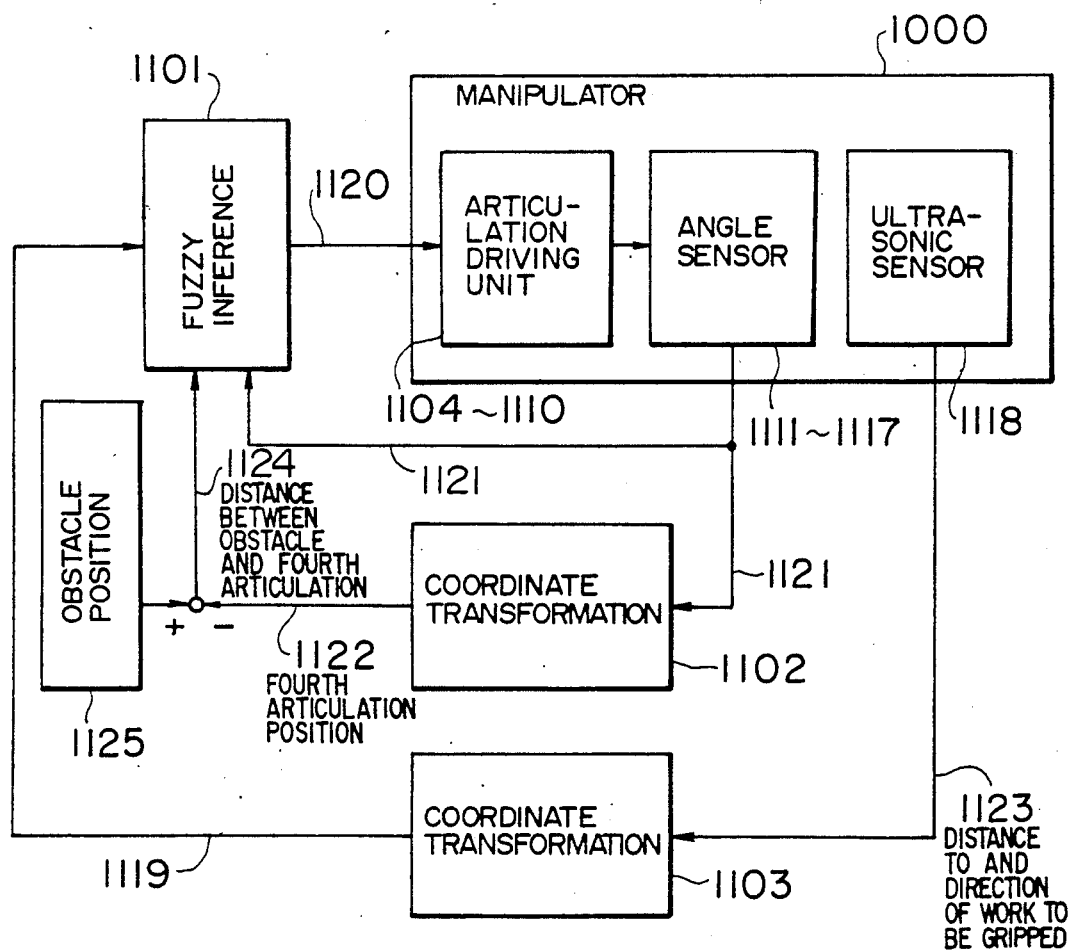
FIG. 11 is a control block diagram of the manipulator system.

FIG. 11 is a control block diagram of the manipulator system shown in FIG. 10. Referring to FIG. 11, the ultrasonic sensor 1118 (1009) measures a distance/direction 1123 to the object work to be held by the gripper 1008 mounted at the manipulator terminal. The obtained distance/direction 1123 is subjected to coordinate transformation 1103 to obtain the finite difference of the position/orientation at the manipulator terminal. In accordance with this finite difference, fuzzy inference 1101 is executed. As described previously, since the manipulator 1000 has seven articulations 1001 to 1007, while the position/orientation of the manipulator terminal is made coincident with the target value, there still remain another element to be operated freely in the geometric sense. Therefore, in addition to deal with a possible trouble, another goal of getting away from an obstacle is set to make the distance from the fourth articulation 1004 to the obstacle as far as possible. To this end, the articulation angles 1121 detected with angle sensors 1111 to 1117 of the articulations 1001 to 1007 of the manipulator 1000 are subjected to coordinate transformation 1102 to thereby obtain the position 1122 of the fourth articulation 1004. In accordance with the difference between an obstacle position 1125 and the position 1122 of the fourth articulation, a distance 1124 between the obstacle and the forth articulation is obtained and used as a parameter for fuzzy inference 1101. Further, since fuzzy rules are to be changed with the conditions of the manipulator articulations, the articulation angles 1121 of the manipulator 1000 are supplied to fuzzy inference 1101. Using these parameters, fuzzy inference 1101 is executed to obtain command values 1120 for the articulations 1001 to 1007 of the manipulator 1000 and supply them to articulation driving units 1104 to 1110.

Next, there will be described a method of setting fuzzy rules for fuzzy inference 1101 shown in FIG. 11. This method is basically the same as those described with the first and second embodiments. Specifically, fuzzy rules for the first to third articulations 1001 to 1003 of the manipulator 1000 are set such that the finite difference of the position of the manipulator terminal is made small, whereas fuzzy rules for the fifth to seventh articulations are set such that the finite difference of the orientation of the manipulator terminal is made small. A fuzzy rule for the fourth articulation 1004 is set such that the finite differences of both position and orientation are made small. With the above arrangement, even if one of the first to seventh articulations 1001 to 1007 of the manipulator 1000 will not operate because of an accident, the position/orientation of the terminal of the manipulator 1000 can be made coincident with the target value. Further, fuzzy rules for getting away from an obstacle are set with respect to the second articulation 1002 such that the y- and z-axis components of the distance 1124 between the obstacle and the fourth articulation 1004 are made large. Such fuzzy rules in this embodiment are given by:

$$\left.\begin{array}{l} \text{IF } \Delta Y \text{ is } SM \text{ then } \Delta\theta_4 \text{ is } PM \\ \text{IF } \Delta Y \text{ is } PB \text{ then } \Delta\theta_4 \text{ is } SM \\ \text{IF } \Delta Y \text{ is } NB \text{ then } \Delta\theta_4 \text{ is } SM \\ \text{IF } \Delta Z \text{ is } PS \text{ then } \Delta\theta_4 \text{ is } NB \\ \text{IF } \Delta Z \text{ is } PB \text{ then } \Delta\theta_4 \text{ is } SM \\ \text{IF } \Delta Z \text{ is } NS \text{ then } \Delta\theta_4 \text{ is } PB \\ \text{IF } \Delta Z \text{ is } NB \text{ then } \Delta\theta_4 \text{ is } SM \end{array}\right\} \quad (12)$$

wherein the membership function PS represents a small positive amount, and the membership function NS represents a small negative amount.

If one of the first to seventh articulations 1001 to 1007 has a trouble and the position/orientation of the terminal of the manipulator 1000 is to be made coincident with the target value, then the above-described seven rules are not used.

Figure 12:
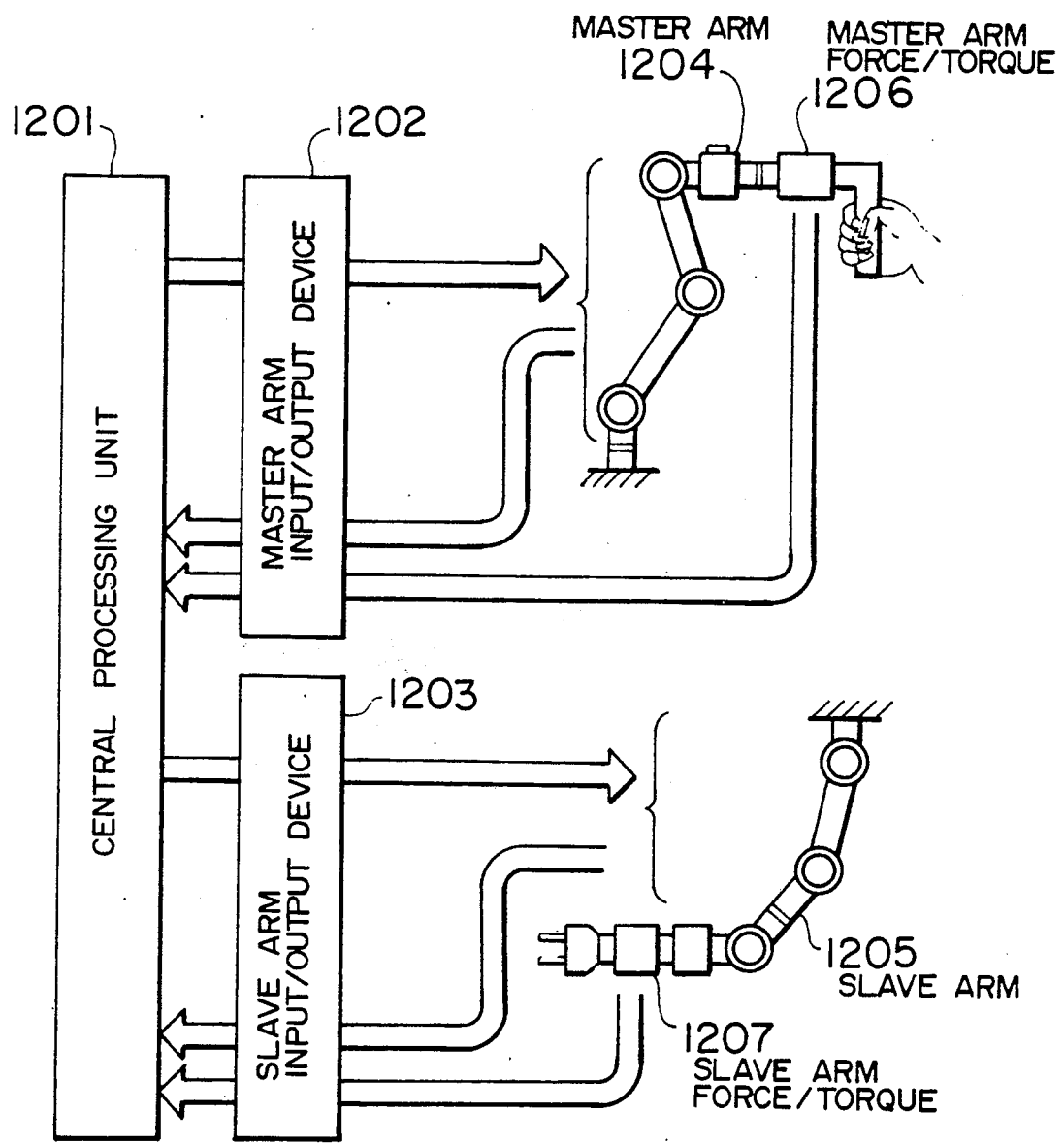
FIG. 12 is a schematic diagram showing the structure of a manipulator system according to the fourth embodiment of this invention.

FIG. 12 is a schematic diagram showing a master-slave manipulator system according to the fourth embodiment of this invention, the system being realized by the fuzzy control method and apparatus for a manipulator of this invention. Referring to FIG. 12, a central processing unit 1201 executes all arithmetic operations for the system. The central processing unit 1201 outputs, via a master arm input/output (I/O) device 1202, command values to articulations of a master arm 1204 for the control of the articulations. The articulation angles detected with articulation angle sensors are supplied via the master arm I/O device 1202 to the central processing unit 1201. Similarly, a force/torque detected with a force/torque sensor 1206 mounted at the terminal of the master arm 1204 is supplied via the master arm I/O device 1202 to the central processing unit 1202.

In the case of a slave arm 1205, similar to the above operations, the central processing unit 1201 outputs, via a slave arm input/output (I/O) device 1203, command values to articulations of the slave arm 1205 for the control of the articulations. The articulation angles detected with articulation angle sensors are supplied via the slave arm I/O device 1203 to the central processing unit 1201. Similarly, a force/torque detected with a force/torque sensor 1207 mounted at the terminal of the slave arm 1205 is supplied via the slave arm I/O device 1203 to the central processing unit 1202. The master and slave arms 1204 and 1205 each have six articulations, so six command values and six articulation angles are supplied to the articulations.

Figure 13:
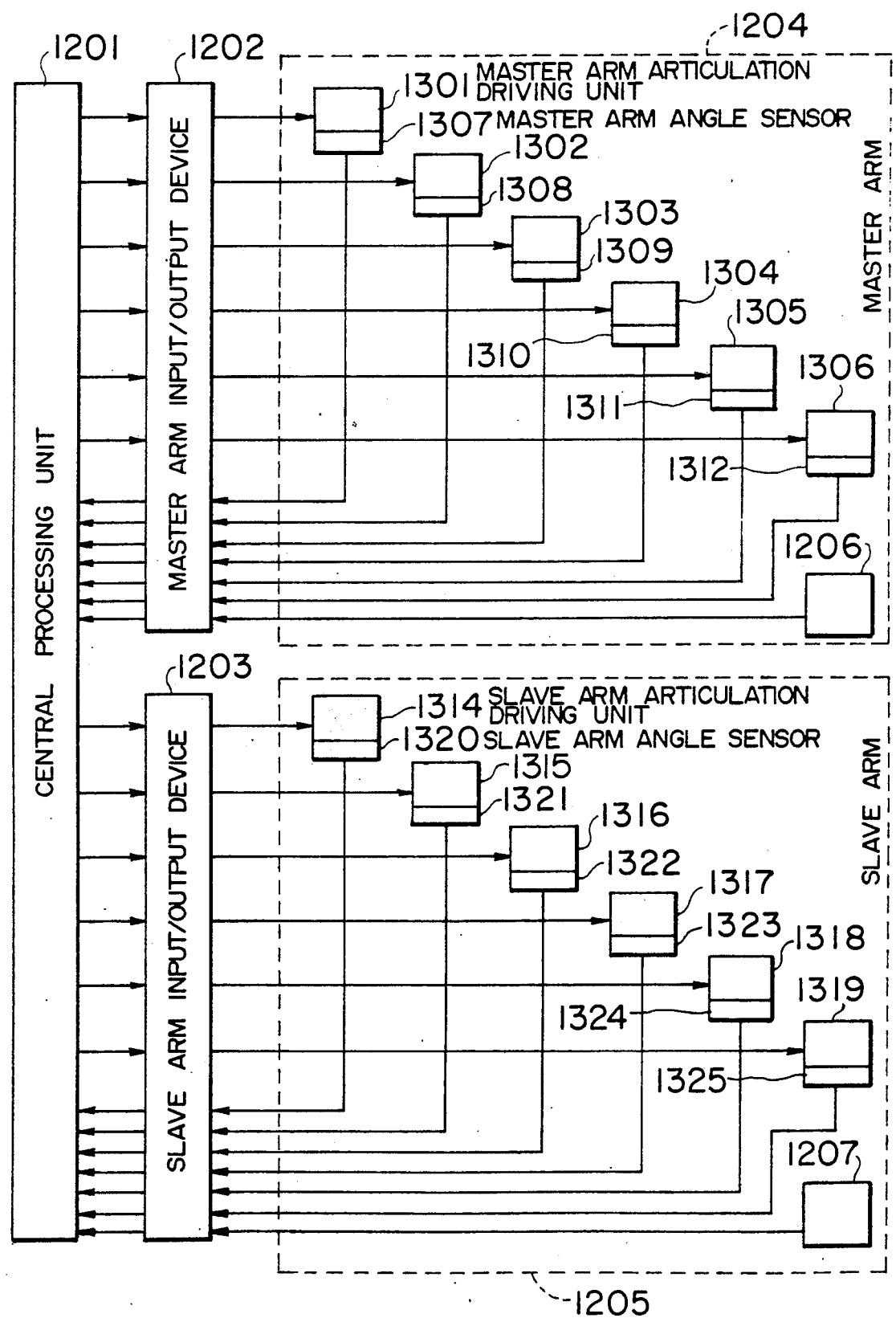
FIG. 13 is a functional block diagram of the manipulator system.

FIG. 13 is a functional block diagram of the manipulator system shown in FIG. 12. Referring to FIG. 13, articulation driving units 1301 to 1306 are mounted on the first to sixth articulations of the master arm 1204 to control the master arm 1204. The articulation angles are detected with the angle sensors 1307 to 1312 mounted on the first to sixth articulations. Similarly, articulation driving units 1314 to 1319 are mounted on the first to sixth articulations of the slave arm 1205 to control the slave arm 1205. The articulation angles are detected with the angle sensors 1320 to 1325.

Figure 14:
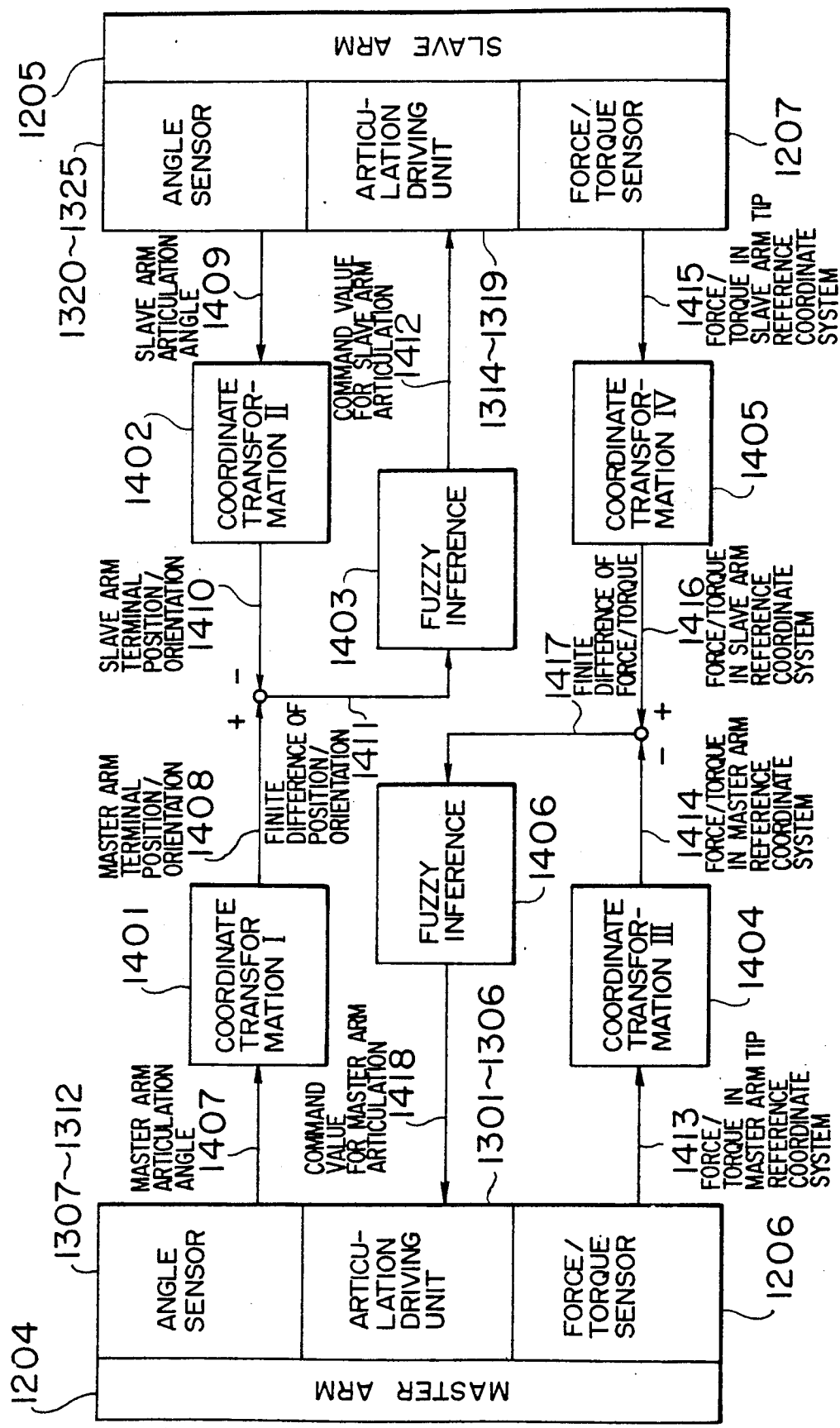
FIG. 14 is a control block diagram of the manipulator system.

FIG. 14 is the control block diagram of the manipulator system shown in FIG. 12 (FIG. 13). The control system of the manipulator system basically executes a force feedback bilateral servo control. Upon operation of the master arm 1204 by an operator, the articulation angles 1407 detected with the angle sensors 1307 to 1312 of the master arm 1204 are subjected to coordinate transformation (I) 1401 to thereby obtain the position-/orientation 1408 of the master arm terminal. Further, the articulation angles 1409 detected with the angle sensors 1320 to 1325 of the slave arm 1205 are subjected to coordinate transformation (II) 1420 to thereby obtain the position/orientation 1410 of the slave arm terminal. This master-slave manipulator aims at causing the slave arm 1205 to move in coincidence with, or following, the position/orientation of the terminal of the master arm 1204. Therefore, it is necessary to make the position-/orientation of the master arm terminal coincident with that of the slave arm terminal. The finite difference 1411 of the position/orientation by the amount of which the salve arm 1205 should move, is obtained by subtracting the position/orientation 1408 by the position/orientation 1410. In accordance with the finite difference 1411, fuzzy inference 1403 is executed by using similar fuzzy rules as described with the position/orientation of the terminal of the manipulator 601 of the second embodiment shown in FIG. 6 (FIG. 9). The obtained command values 1412 to articulations of the slave arm 1205 are supplied to drive the articulation driving units 1314 to 1319 to move the slave arm 1205.

Driving the master arm 1204 is so performed in the following manner that an operator is given a force which the slave arm 1205 receives. The force/torque signal 1413 from the force/torque sensor 1206 mounted at the terminal of the master arm 1204 is a force/torque signal described with the coordinate system of the force/torque sensor 1206 itself, i.e., a tip coordinate system of the master arm 1204. This force/torque is subjected to coordinate transformation (III) to obtain a force/torque represented by the master arm reference coordinate system. In a similar manner, the force/torque signal 1415 from the force/torque sensor 1207 on the slave arm 1205 described with the slave arm tip coordinate system is subjected to coordinate transformation (IV) 1405 to obtain the force/torque 1416 described with the slave arm reference coordinate system. The finite difference 1417 of the force/torque is obtained by subtracting the force/torque 1416 by the force/torque 1414. In accordance with the force/torque finite difference 1417, fuzzy inference 1406 is executed by using similar fuzzy rules for the force/torque as described with the second embodiment. The obtained command values 1418 to articulatior's of the master arm 1204 are supplied to the articulation driving units 1301 to 1306 to drive the master arm 1204.

In the above embodiments, instead of using matrix operations, fuzzy control using fuzzy inference has been executed for the control of, e.g., six articulations. The control of articulations may be made by using a combination of conventional matrix operations and fuzzy reductions. For example, matrix operations for coordinate transformation (inverse transformation) may be carried out for some of articulations of a manipulator to obtain the articulation angles thereof with a given position/orientation of the manipulator terminal, and fuzzy inference as of this invention is carried out for the remaining articulations.

We claim:

1. A manipulator system having a plurality of articulations, comprising:

destination coordinate means for giving a destination coordinate value of the position and orientation of the terminal of a manipulator;

present coordinate means for giving a present coordinate value of the position and orientation of the terminal of said manipulator;

finite difference generating means connected to said destination coordinate means and said present coordinate means for generating finite differences between said destination coordinate value and said present coordinate value; and fuzzy inference means connected to said finite difference generating means for executing a fuzzy inference of said finite differences data for at least one of said plurality of articulations.

2. A manipulator system according to claim 1, further comprising angle sensor means for detecting the angle of each of said plurality of articulations of said manipulator and supplying said angle to said present coordinate means.

3. A manipulator system according to claim 2, wherein the number of said plurality of articulations of said manipulator is seven.

4. A manipulator system according to claim 1, wherein said present coordinate means includes a plurality of TV camera means for measuring the present coordinate value of the position and orientation of the terminal of said manipulator.

5. A manipulator system according to claim 1, wherein said fuzzy inference means includes weighting means for weighting, with respect to the position of said terminal of said manipulator, articulations near the base of said manipulator greater than articulations near the terminal of said manipulator.

6. A manipulator system according to claim 1, wherein said present coordinate means includes ultrasonic measurement means for measuring the present coordinate value of the position and orientation of said terminal of said manipulator.

7. A manipulator system according to claim 1, wherein said manipulator has a master-slave manipulator function.

8. A controller for a manipulator having a plurality of articulations, comprising:

means for giving a finite difference set between a destination value and a present value of the position and orientation of the terminal of said manipulator; and means for determining a command value for each articulation angle by executing a fuzzy inference of said articulations with respect to at least one articulation.

9. A controller according to claim 8, further comprising a sensor for giving a present value of the position and orientation of said terminal of said manipulator.

10. A controller according to claim 9, wherein said sensor is a TV camera.

11. A controller according to claim 9, wherein said sensor is an ultrasonic sensor.

12. A controller according to claim 10, wherein said manipulator is a manipulator having a redundant degree of freedom.

13. A controller according to claim 11, wherein said manipulator is a master-slave manipulator.

14. A control method for a manipulator having a plurality of articulations, comprising:

a step of giving a finite difference set between a destination value and a present value of the position and orientation of the terminal of said manipulator; and a step of executing a fuzzy inference of said articulations with respect to at least one articulation and determining a command value for each articulation angle.

15. A control method according to claim 14, further comprising a step of using a fuzzy rule which executes a fuzzy inference of an articulation near the base of said manipulator while giving an emphasis on the finite differences of the position of said manipulator terminal greater than the finite differences of the orientation.

16. A control method according to claim 14, further comprising a step of obtaining a present value of the position and orientation of said manipulator terminal by subjecting each manipulator articulation angle to coordinate transformation.

* * * * *